United States Patent Office 3,443,435
Patented May 13, 1969

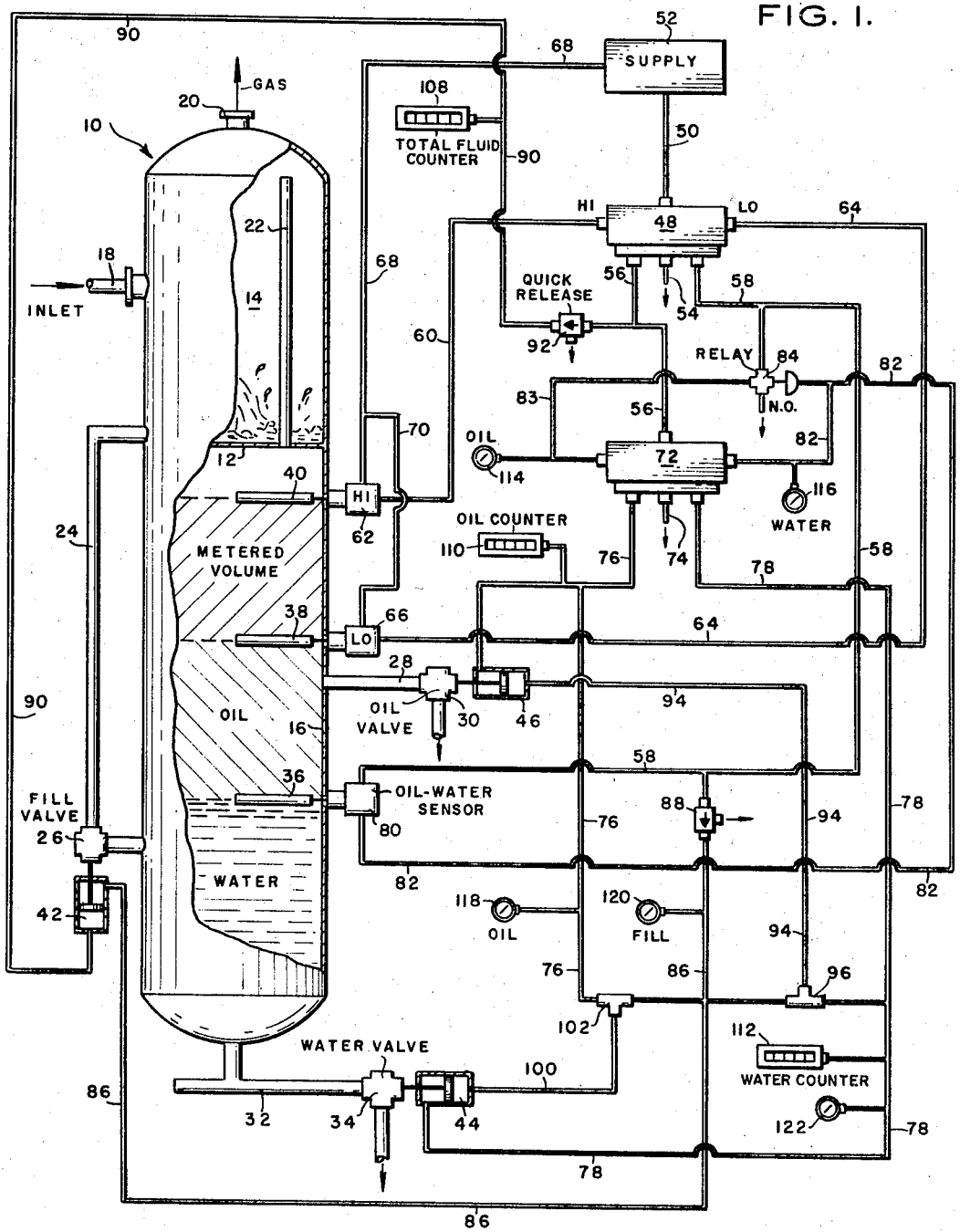

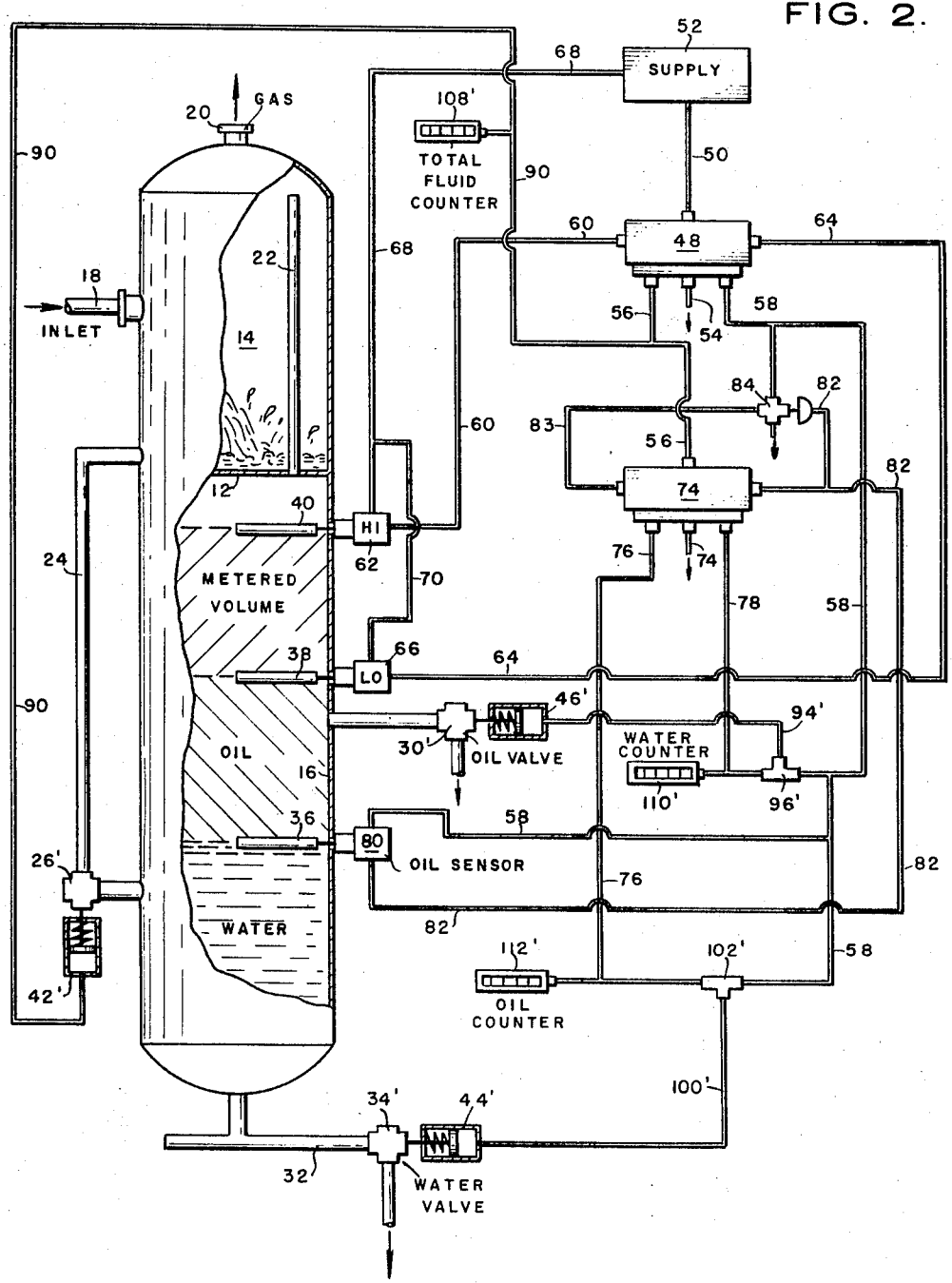

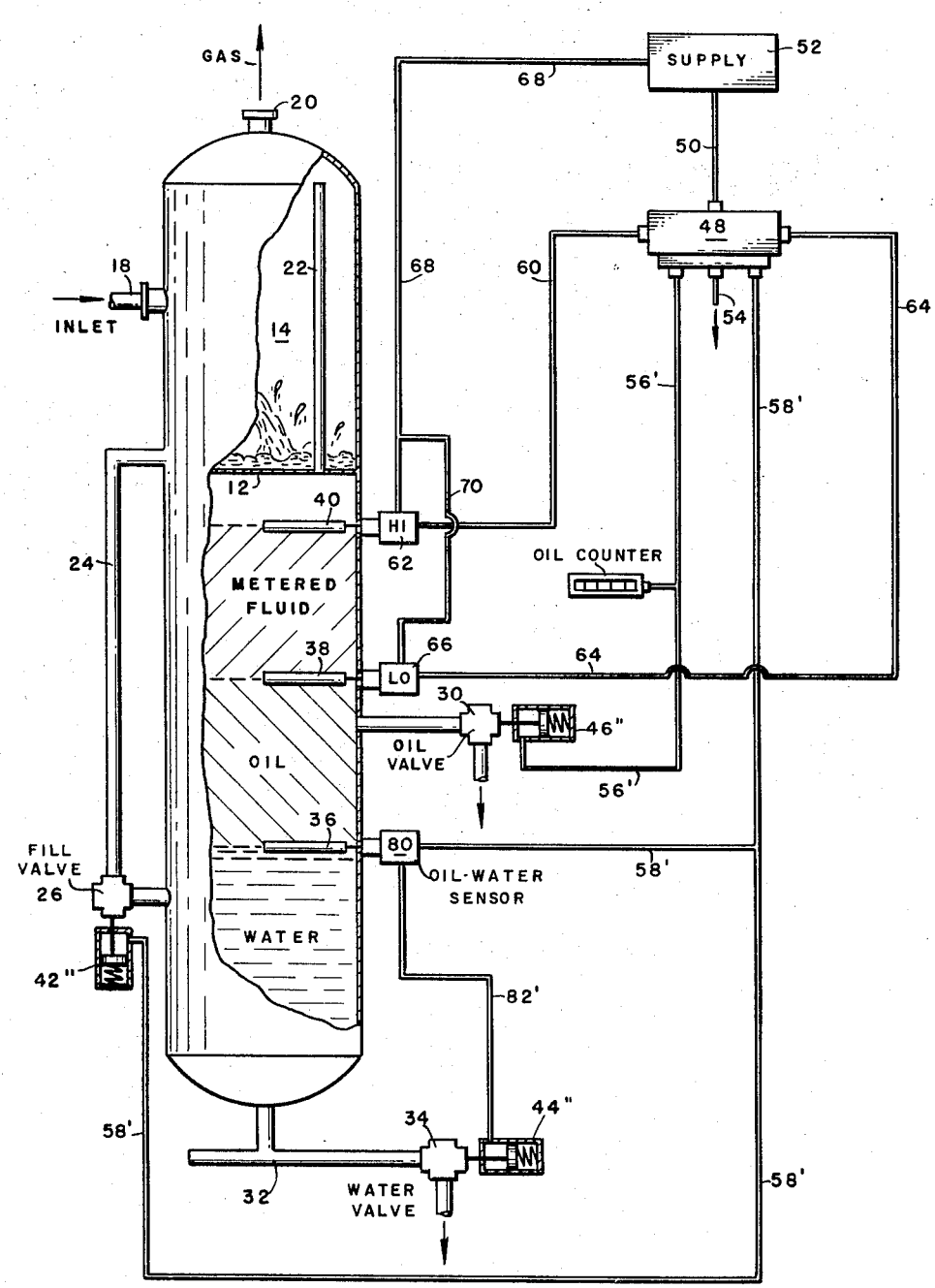

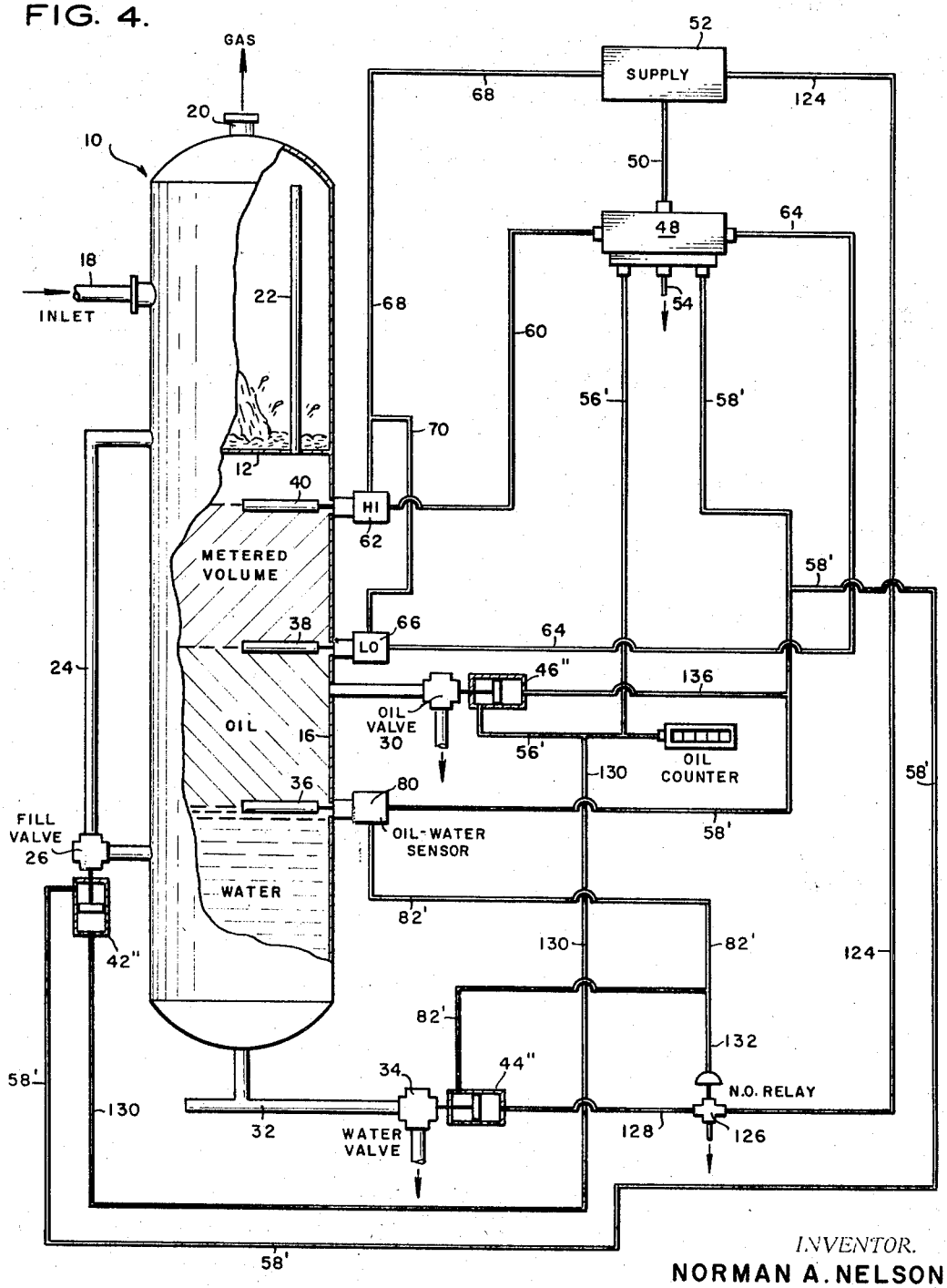

3,443,435
METERING APPARATUS
Norman A. Nelson, Houston, Tex.
Filed Sept. 10, 1965, Ser. No. 486,298
Int. Cl. G01f *13/00, 23/22, 23/06*
U.S. Cl. 73—224        10 Claims

ABSTRACT OF THE DISCLOSURE

Apparatus for metering of immiscible liquids comprising a vessel having an inlet through which liquids may flow into the vessel for separation therein into upper and lower portions, and upper and lower outlets through which the upper and lower portions may be separately discharged. Separate valves are provided for controlling the flow of liquid through the inlet and each of the outlets and control means is provided for closing the inlet when the liquid in the vessel reaches a predetermined level and for maintaining the inlet closed during the outflow of liquid from the vessel. Means is also provided for allowing the discharge of the immiscible liquids upon the accumulation of predetermined amounts of the liquids in the vessel and for separately metering the discharge of each liquid.

The system of the invention includes the step-by-step operation of the apparatus by which the level of the liquid in the vessel is maintained by opening of the inlet, and whereby each of the immiscible liquids is separately discharged through the outlets, and may also include the maintaining of the inlet closed during the outflow of liquid from the vessel, and the separate metering of each of the liquids discharged.

---

This invention relates to a metering system and apparatus therefor, and more particularly to the metering of fluids, such as oil and water obtained from oil and gas wells.

The invention is useful in the metering of immiscible liquids occurring as components of fluids from which such components are separated and finds particular utility in connection with the metering of oil and water from well fluids obtained in the production from oil and gas wells.

Apparatus for the metering of oil and water obtained from oil and gas wells as heretofore commonly employed are usually of multicompartment construction, often having as many as four compartments for the separation of gas from the liquid components of the well fluid, the separation of the oil and water of the liquid and the separate metering of the oil and water components. A multicompartment system of this kind requires the use of extensive piping and metering control equipment, it being necessary to provide for the transference of the liquid separated from the gas to a compartment in which the oil and water may separate at different levels and the removal of the oil and water to separate metering compartments. Additional piping is also required to provide for the equalizing of the pressure in the various compartments to facilitate the flow of the liquids from one compartment to another.

Multicompartment metering apparatus of this kind is not only expensive to construct, because of the number of valves and metering controls called for, but is troublesome and costly to maintain.

The present invention has for important objects the provision of a metering system and apparatus by which the above and other disadvantages of a multicompartment system may be eliminated and which embodies apparatus of greatly simplified construction and a system which is accurate and automatic in operation.

Another object of the invention is to provide metering apparatus of the kind mentioned having only two compartments and in which the arrangement of piping and valve mechanism is greatly simplified.

A further object of the invention is the provision in a metering system of the type referred to of control mechanism which is fully automatic and continuous in operation, and by which the total liquid of the well fluid and the amounts of the water and oil separated therefrom or any of such components may be accurately metered.

Another object of the invention is to provide a metering system and apparatus which is of simple design, economical manufacture and which is inexpensive to maintain.

The above and other important objects and advantages of the invention will become apparent from the following detailed description of preferred embodiments of the same when considered in conjunction with the annexed drawings, wherein—

FIGURE 1 is a diagrammatic view illustrating a preferred embodiment of the invention and showing the metering system as employed with motor valves of the double acting type designed to be opened and closed by pressure fluid under the control of the valve control apparatus of the system;

FIGURE 2 is a view similar to that of FIGURE 1 illustrating a modified form of the invention making use of motor valves of the type which are designed to be closed by the application of fluid under pressure and which have means for opening the same when the closing pressure of such fluid is released;

FIGURE 3 is a view similar to that of FIGURE 1, illustrating a further modification of the invention which makes use of valves of a type designed to be opened in response to the application of fluid under pressure and having means for closing the same when the opening pressure of such fluid is released;

FIGURE 4 is a view, similar to that of FIGURE 3 illustrating a still further modified form of the invention, wherein motor valves of the double acting type are employed which are adapted to be both opened and closed by the application of fluid pressure;

Figure 6:
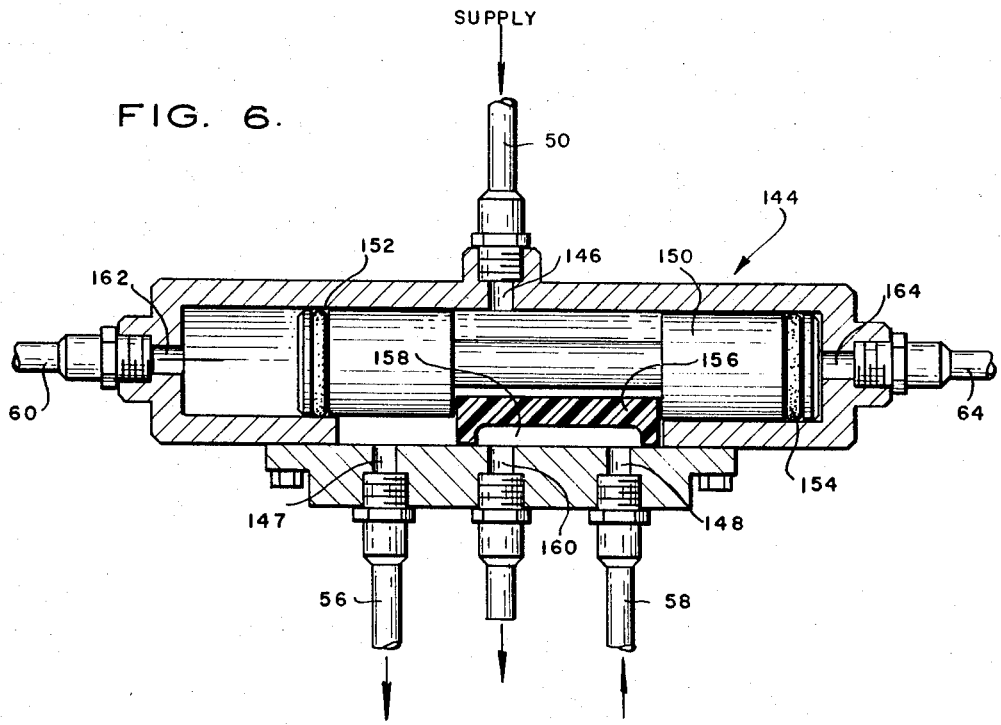
FIGURE 6 is a detail view, on a somewhat enlarged scale, showing details of structure of a switching valve of a usual type suitable for use in the system of the invention.

Referring now to the drawings in greater detail the invention is illustrated herein in connection with its use in the metering of oil and water separated from well fluid obtained from oil and gas wells, wherein the proportions of water and oil often vary throughout a wide range. The apparatus of the system, includes a vessel or tank, designated 10, which serves as a separator for the gas and liquid components of the fluid as well as for the metering of the immiscible liquid components thereof, the vessel being provided with an internal wall or partition 12 which divides the same into an upper separating compartment 14 in which separation of the gases from the well fluid may take place, and a lower compartment 16 in which separation of the oil and water may take place and which also serves for the metering of the immiscible liquids.

The vessel has an inlet 18 through which the well fluid may enter the upper compartment 14, and an outlet 20 at the top of the vessel through which gas separated from the fluid may passout into a suitable disposal line.

Within the compartment 14 a standpipe 22 extends upwardly from the partition 12, whose lower end is in communication with the lower compartment 16 at the top thereof and whose upper end is open into the upper compartment in upwardly spaced relation to the partition. The pipe 22 is provided to equalize the gas pressure in the upper compartment with that in the lower compartment above the liquid therein.

A downcomer or fill pipe 24 is provided for the outflow of liquid from the upper compartment into the lower compartment, under the control of a full valve 26 whose function and operation is to be more fully explained hereinafter.

An oil discharge pipe 28 is connected in communication with the lower compartment mediate its top and bottom at a location to provide for the outflow of oil therefrom under the control of an oil discharging or dumping valve 30, in a manner to be pointed out, and the vessel has a water outlet pipe 32 which is in communication with the bottom of the vessel and through which water may be discharged under the control of a water discharging or dumping valve 34, whose manner of operation will be described hereinafter.

Oil and water sensing mechanism, including a float 36 is disposed at a lower level of the compartment 16 which forms a part of the metering apparatus and at upper levels of the lower compartment control valve mechanisms including vertically spaced floats 38 and 40 are located in position to actuate control valves by which the filling and dumping operations of the system are controlled whereby metering of the liquid components is carried out.

As illustrated in FIGURE 1, the fill valve 26, and the water and oil discharging valves 34 and 30 may be motor valves of a well known type designed to be both opened and closed by the application of fluid under pressure, these valves being provided with suitable means, such as the pressure cylinders 42, 44 and 46, respectively, having connections for the admission and exhaust of pressure fluid, whereby the valves may be opened and closed in the usual manner.

The system of the invention, as illustrated in FIGURE 1, has a first switching valve 48, provided with an inlet to which fluid under pressure is supplied through a pipe 50 from a suitable source 52 of such fluid, and an outlet 54 through which fluid may be exhausted. The valve 48 also has ports to which pipes 56 and 58 are connected, to which pressure fluid is supplied from pipe 50, or from which the same is exhausted through the outlet 54, depending upon the position to which the switching valve is moved.

The switching valve is of the double acting type operated in the usual manner by pressure fluid supplied thereto through a pipe 60 under the control of an upper control valve 62 actuated by the upper float 40 to move the switching valve to a position to supply pressure fluid from the pipe 50 to pipe 56 and to exhaust fluid from pipe 58 through the outlet 54, and by pressure fluid supplied to the valve through a pipe 64 under the control of a lower control valve 66 actuated by the lower float 38 to move the switching valve to a position to supply pressure fluid from pipe 50 to pipe 58, while exhausting the same from pipe 56. Pressure fluid from the source 52 is supplied to the current valve 62 through a pipe 68 from which a branch pipe 70 also supplies pressure fluid to the control valve 66.

Thus when the liquid in the compartment 16 rises to a predetermined upper level upper float 40 will be moved upwardly to open control valve 62 to supply pressure to switching valve 48 through pipe 60 to move the switching valve to a position to supply pressure to pipe 56 while exhausting fluid from pipe 58, and when the liquid in compartment 16 falls below such upper level float 40 will move downwardly to close valve 62 to shut off the supply of pressure through and bleed pressure from pipe 60. The control valve 62 is preferably of the 3-way type, whereby the bleeding off of pressure from pipe 60 is accomplished when the supply of pressure to pipe 60 from pipe 68 is shut off. However, the position of the switching valve is not changed by the removal of fluid pressure from pipe 60.

Similarly when the level of liquid falls below a predetermined lower level float 38 will move downwardly to open valve 66, which is similar to valve 62, to supply pressure to switching valve 48, through pipe 64 to move the switching valve to a position to supply pressure to pipe 58 while exhausting fluid from pipe 56.

A second switching valve 72 is provided in the system, which is similar to the valve 48 and which has an inlet to which pipe 56 is connected, and an exhaust outlet 74. The valve 72 also has ports to which pipes 76 and 78 are connected to which pressure is supplied from pipe 56 or from which fluid is exhausted through outlet 74 depending upon the position to which valve 72 is moved.

The water and oil sensing mechanism of the invention has a control valve 80, similar to valve 62, which is arranged to be opened when the float 36 moves upwardly in response to a rise in the level of the water in the compartment 16 and to be closed upon downward movement of the float when the water level is lowered. The control valve 80 is connected to the pipe 58 which is connected to the switching valve 48, and a pipe 82 also connects the valve 80 to one end of the switching valve 72 so that upon opening of the valve 80 pressure may be applied through pipes 58 and 82 to move the switching valve 72 to a position to supply pressure to pipe 78 and exhaust fluid from pipe 76. Pipe 82 is also connected to a normally open, 3-way relay valve 84 which controls the flow of fluid through a line 83 leading to the other end of switching valve 72 and connected to pipe 58 and which will be closed and the pressure in line 83 will be exhausted when pressure is admitted to pipe 82 so that pressure will be applied to switching valve 72 to move the same to a position to supply pressure to pipe 78 and exhaust the same from pipe 76. Valve 84 will be open when there is no pressure in line 82, either when valve 80 is closed, or when valve 48 is in a position to exhaust fluid from pipe 58. When valve 84 is open and switching valve 48 is in position to supply pressure to pipe 58 and exhaust pressure from pipe 56, valve 84 admits pressure through line 83 to valve 72 to move the same to a position to supply pressure to pipe 76 and exhaust fluid from pipe 78.

Fill valve actuating cylinder 42 is connected by a pipe 86 with pipe 58 through a quick exhaust device 88 which closes when pressure is being supplied to pipe 86 from pipe 58 and which opens to exhaust pressure from pipe 86 when pressure is exhausted from pipe 58 through switching valve 48. Cylinder 42 is also connected through a pipe 90 to pipe 56 by means of a quick exhaust device 92, similar to the quick exhaust device 88, which closes when pressure is supplied to pipe 56, and which opens to exhaust pressure from pipe 90 when pressure is exhausted from pipe 56 through switching valve 48. By this arrangement when pressure is supplied to cylinder 42 through pipe 86 fill valve 26 will be opened and when pressure is applied to cylinder 42 through pipe 90 fill valve 26 will be closed.

Figure 5:
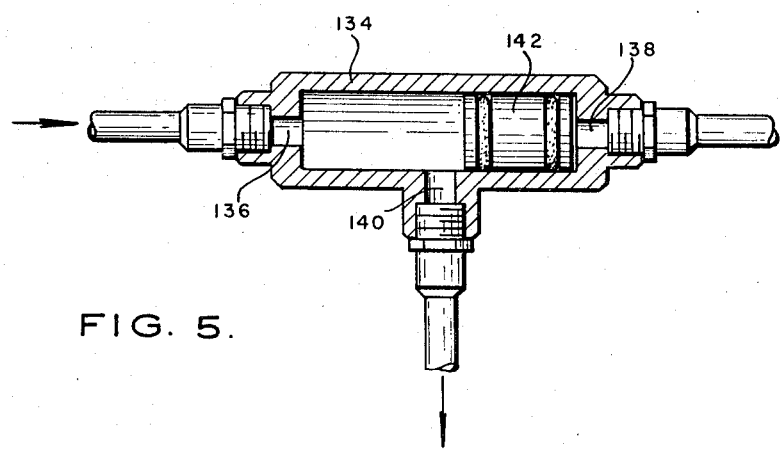
FIGURE 5 is a detail view on a slightly enlarged scale showing a type of check valve with which the apparatus may be provided.

Oil discharge cylinder 46 is connected to pipe 76 to open valve 30 when pressure is supplied thereto, and is also connected to a pipe 94 leading from double check valve 96, of the type illustrated in FIGURE 5, which is connected to pipes 86 and 78 to close valve 30 when pressure is supplied to the cylinder therefrom.

Water discharge valve cylinder 44 is connected to pipe 78 to conduct opening pressure to the cylinder to open valve 34, and the cylinder is also connected to pipe 76, through a pipe 100 into which a check valve 102, similar to the valve 96 is connected to supply pressure from pipe 76 to the cylinder to close the valve 34. Valve 102 is also connected to pipe 86 in a manner to apply closing pressure to valve 34 from pipe 58. By this arrangement closing pressure is applied to valve 34 to prevent the outflow of water when the oil discharge valve 30 is open and when pressure is being supplied through pipe 58 to open the fill valve 26, so that water will not be discharged during the refilling of the meter.

The check valve 96 is connected to pipe 78 in a manner to supply closing pressure to cylinder 46 to maintain the oil discharge valve 30 closed during the time that opening pressure is supplied to cylinder 44 to open water discharge valve 34, so that oil will not be discharged during the outflow of water.

Check valve 96 is also connected to pipe 86 in a manner to supply closing pressure therefrom to cylinder 30 to maintain the valve 30 closed during the application of opening pressure to cylinder 42 to open valve 26 so that oil will not be discharged during the refilling of the meter.

During the time that the oil discharge valve 30 is open, pressure will be supplied through pipes 76 and 100 to hold the water valve 34 closed, so that there will be no discharge of water during the metering outflow of oil.

Suitable indicating or recording devices, which may be in the form of pressure actuated counting mechanism of well known character, such as those indicated at 108, 110 and 112, may be connected in communication with the pipes 90, 76 and 78, respectively, whereby the number of times that the fill valve 26, oil discharge valve 30 and water discharge valve 34 are opened may be determined, so that the total volume of liquid which passes through the meter and the respective volumes of water and oil metered thereby may be readily accounted for. Thus, the number of times that the fill valve 26 is opened will be the sum of the number of times which the oil and water discharge valves are opened, and from these numbers the amount of oil and water and the total volume of liquid metered may be accurately determined.

Suitable pressure gauges, of the usual type, are also provided, such as those shown at 114, 116, 118, 120 and 122, connected in communication with the pipes 56, 82, 100, 86 and 78, respectively, from which the particular stage of the metering cycle which is taking place at any time may be determined and the sequence of the various stages of the metering operation may be followed, whereby the operation of the equipment may be checked and the occurrence of malfunctioning at any location determined.

In the operation of the equipment, assuming that the level of liquid in the compartment 16 has fallen to a point at which the lower float 38 moves downwardly to open the lower control valve 66 to supply pressure to the switching valve 48 to move the same to a position in which pressure is supplied to pipe 58 from pipe 50 while fluid is exhausted from pipe 56, whereby pressure is exhausted from pipe 90, and supplied through pipes 58 and 86 to open the fill valve 26 to refill the compartment. Pressure will also be supplied through pipes 86 and 100 through check valve 102 to cylinder 44 to hold the water discharging valve 34 closed and through pipes 86 and 94 through check valve 96 to hold the oil discharging valve 30 closed, so that no oil or water will be discharged during refilling of the compartment.

As the compartment starts to refill the level of liquid will rise to a point to close the lower control valve 66 and exhaust the pressure from switching valve 48 through pipe 64 and control valve 66. When the level of liquid rises to a point to move the float 40 upwardly to open upper control valve 62, pressure will be supplied through pipe 60 to switching valve 48 to move the same to a position to supply pressure to pipe 56 while exhausting fluid from pipe 58. Pressure will then flow to cylinder 42 from pipe 56 through pipe 90, while the pressure is exhausted from cylinder 42 through pipe 86 and quick exhaust device 88 to close the fill valve 26.

During the time that switching valve 48 is in position to supply pressure to pipe 58 while exhausting from pipe 56, pressure will also be supplied to the control valve 80 of the water and oil sensing mechanism, so that the switching valve 72 will be moved to one or the other of its positions depending upon whether the valve 80 is open or closed. In the event that the float 36 is in water, the valve 80 will be open to supply pressure to the normally open relay valve 84 to close the same, so that pressure will be cut off and exhausted from pipe 83 and switching valve 72 will be moved to a position to connect pipe 56 with pipe 78 and to connect pipe 76 with exhaust outlet 74. During this time, however, no pressure is supplied to switching valve 72 through pipe 56, so that the condition of the system is unchanged until the liquid level reaches the upper float 40. With the valve 72 thus positioned, a high signal resulting from the opening of valve 62 will shift switching valve 48 to a position to supply pressure to pipe 56 and exhaust from pipe 58, so that pressure is supplied to pipe 78 to open water discharge valve 34, and pressure is supplied to cylinder 46 to hold the oil discharged valve 30 closed.

If on the other hand the float 36 should be in oil, when the liquid level reaches the upper float 40, the valve 80 will be closed and no pressure will be supplied through pipe 82 to relay valve 84 which will be open to supply pressure to switching valve 72 through pipe 83 to hold the switching valve in position to supply pressure to pipe 76 and exhaust fluid from pipe 78, so that pressure is supplied to cylinder 46 through pipe 76 to open the oil discharge valve 30, and to cylinder 44 through pipe 100 to close water discharge valve 34.

By this arrangement neither the oil discharge valve nor the water discharge valve can open until the level of liquid rises to a point actuate float 40 to open valve 62, and upon the opening of valve 62 the water discharge valve 34 will be opened if control valve 80 is open, or the oil discharge valve 30 will be opened if control valve 80 is closed.

Moreover, the positions of the dumping discharging valves cannot change during a dumping cycle, even though there should be a change in position of the water and oil sensing mechanism.

It will also be seen that during the time that the fill valve 26 is open the supply of pressure to pipe 56 is cut off, since switching valve 48 will be in a position to supply pressure to pipe 58 and exhaust fluid from pipe 56, so that no opening pressure can be supplied to the cylinder 46 or 44, regardless of the position of the switching valve 72, but closing pressure is supplied through pipes 58, check valve 102 and pipe 100 to cylinder 44 and through pipes 58, check valve 96 and pipe 94 to cylinder 46 to maintain the oil and water discharging valves 30 and 34 closed during the refilling of the meter.

A somewhat modified form of the invention is illustrated in FIGURE 2, wherein the motor valves 26′, 30′ and 34′ are of a type designed to be held in open position and to be closed by pressure under the control of control valves 62, 66 and 80 which are the same as, and are actuated in the same manner as, described in connection with the embodiment of the invention shown in FIGURE 1.

The operation of the form of the invention illustrated in FIGURE 2 is similar to that of the form shown in FIGURE 1 except that the motor valves 26′, 30′ and 34′ will be open when the supply of pressure is cut off therefrom and will be closed by the supply of pressure thereto.

A further modification of the invention is illustrated in FIGURE 3, wherein the motor valves 26, 30 and 34 are of a type which are normally closed and designed to be opened under the influence of pressure.

In this form of the apparatus only one switching valve 48 is employed, which is moved to a position to supply pressure to pipe 56′ and exhaust pressure from pipe 58′ upon the opening of the upper control valve 62 when the compartment 16 has been filled, and which is moved to the reverse position to supply pressure to pipe 58′ and exhaust pressure from pipe 56' when the level of liquid falls to a point to open valve 66.

During the operation of this form of the equipment, when the compartment 16 is filled, pressure is supplied to open the oil discharge valve 30, so that oil will be discharged until the level of liquid reaches the lower float 38, whereupon lower control valve 66 is then opened, thus supplying pressure to the switching valve 48 through pipe 64 to reverse the position of the switching valve to supply pressure to pipe 58' and exhausting the same from pipe 56' to supply pressure to control valve 80 which in turn controls the supply of pressure through pipe 82' to cylinder 44" to open valve 34 whereby water will be discharged through pipe 32. Pressure is also supplied through line 58 to cylinder 42" to open fill valve 26. By this arrangement refilling may take place while water is being discharged. It will be apparent that during the discharge of oil the water discharge valve and the fill valve 26 will remain closed and during the filling operation no oil will be discharged. Moreover, water may be discharged only when the float 36 of the water and oil sensing mechanism is in water, which results in the opening of control valve 80 to supply pressure through pipe 82' to cylinder 44" to open water discharge valve 34.

In this form of the invention oil only is metered.

In FIGURE 4 there is illustrated a still further modification of the invention similar to the form shown in FIGURE 3, but wherein motor valves of the double acting type, like those shown in the form of the invention illustrated in FIGURE 1, are employed, which are adopted to be both opened and closed by the application of fluid under pressure.

The motor valves 26, 30 and 34 of the apparatus illustrated in FIGURE 4 are the same as and are operated in the same manner as the motor valves 26, 30 and 34 of FIGURE 1, but the control system of FIGURE 4 has only one switching valve 48, as illustrated in FIGURE 3. FIGURE 4, in addition to the piping arrangement shown in FIGURE 3, also includes a pipe 124 which is connected directly to the supply source 52 and through which closing pressure is supplied through a normally open relay valve 126 to the cylinder 44" through pipe 128 to close water discharge valve 34. A pipe 130 connects the pipe 56' to cylinder 42" to supply closing pressure to the fill valve 26, and a pipe 132 is provided through which pressure from pipe 82' is supplied to relay valve 126 to close the same when control valve 80 of the water and oil sensing mechanism is open. Pipe 82' is also connected to cylinder 44" to supply opening pressure thereto to open the water discharge valve 34.

A pipe is also provided connecting pipe 58' with cylinder 46" to supply closing pressure to oil discharge valve 30.

The operation of the equipment as illustrated in FIGURE 4 is similar to that described for FIGURE 3, except that the motor valves are both opened and closed by application of pressure.

The control valves 62 and 66 with their respective floats 40 and 38 in each of the above described embodiments of the invention constitute upper and lower control assemblies of the system.

The double acting check valves shown at 96 and 102 in FIGURE 1 and at 96' and 102' in FIGURE 2 may be of a type such as that illustrated in FIGURE 5, wherein the valve has a hollow casing 134 provided with end ports 136 and 138 and an intermediae port 140. A valve member 142 is movably disposed in the body for movement to a position to close off communication between ports 136 and 140 while allowing fluid flow through ports 138 and 140 or to another position to close off communication between ports 138 and 140 while allowing flow through ports 136 and 140. The valve member 142, however, always prevents communication between ports 136 and 138.

The switching valves 48 and 72 may conveniently be of the type illustrated in FIGURE 6, wherein the valve has a tubular body 144 provided with ports 146, 147 and 148, of which the port 146 is an inlet port connected to pipe 50, while the ports 147 and 148 are connected to the pipes 56 and 58, respectively. The body 144 also has an exhaust port 160.

Within the body 144 a valve member or spool 150 is movably disposed for longitudinal sliding movement therein, which member carries longitudinally spaced seal forming means 152 and 154 positioned to form seals between the member and body.

The spool 150 has a reduced central portion with which a valve element 156 is disposed for longitudinal movement with the spool. The element 156 is commonly called a sliding D-valve and has a recess portion 158, which is positioned to establish communication between port 147 and exhaust port 160 in one position of the spool and between port 148 and exhaust port 160 in the other position of the spool.

The body 144 is also provided with end ports 162 and 164 for connection, respectively, to pipes 64 and 60.

The spool 150 is operated by pressure admitted through ports 162 and 164 to move the spool to one or the other of its positions.

In one position of the spool fluid may flow from pipe 50 into pipe 56 while fluid is exhausted from pipe 58 through element 156 to exhaust port 160 and in the other position of the spool fluid is supplied to pipe 58 while being exhausted from pipe 56.

It is believed that the method of the invention will be clearly apparent from the above description of the operation of the apparatus.

The method of the invention comprises opening the fill valve to allow the inflow of the liquid to be metered while maintaining the outlet closed. The liquid will then form separate upper and lower immiscible portions in the vessel. The inflow is continued until the level of liquid in the vessel reaches a predetermined upper level, after which a selected one of the outlets is opened to allow the outflow of liquid from one of the liquid portions until the level of liquid in the vessel falls to a predetermined lower level, whereupon the outflow is discontinued and the inflow is reestablished to refill the vessel.

In carrying out the method only a selected one of the outlets is opened, depending upon the level to which the lower liquid portion has risen. If the level of the lower liquid portion is above a predetermined level then the lower outlet only is opened to discharge liquid from the lower portion and if the level of the lower liquid portion is below such predetermined level, then the upper outlet only is opened to discharge liquid from the upper portion.

The method of the invention also includes the metering of either of the immiscible portions alone, by opening the valve which controls the discharging of the unmetered portion, during the time that the fill valve is open. Thus, the fill valve will be maintained open until the level of liquid reaches the upper control valve float and during this time the unmetered fluid phase may be discharged. When the level of liquid reaches the upper float, both the fill valve and the discharge valve for the unmetered phase will be closed, and the discharge valve for the metered phase will be opened and remain open until the liquid level falls to a predetermined lower level.

It will, of course, be understood that the various components of the equipment described herein are intended by way of illustration only and that the particular type of mechanism employed as well as the arrangement of the parts thereof may be changed or modified.

The invention thus provides a metering system and apparatus which may be operated continuously under widely varying conditions, and in which means is embodied for the accurate metering of the total volume of fluid which passes through the apparatus as well as the volume of each of the separate components of the fluid.

Having thus clearly shown and desclibed the invention, what is claimed as new and desired to secure by Letters Patent is:

1. Apparatus for the separating, metering and separate dispensing of immiscible liquids comprising a vessel having an inlet through which liquid may flow into the vessel for separation therein into upper and lower immiscible portions and separate outlets one for each of said immiscible portions through which each of said portions may flow from the vessel, the outlet for said upper portion being spaced above the outlet for said lower portion, means for closing the inlet in response to the inflow of liquid into the vessel when the liquid therein reaches a predetermined upper level and for opening the same in response to the outflow of liquid from the vessel when the liquid therein reaches a predetermined lower level, means for selectively opening and closing said outlets means for preventing the opening of said inlet during the outflow of liquids from the vessel and means for recording each opening of each of said outlets.

2. Apparatus for the separating, metering and separate dispensing of immiscible liquids comprising a vessel having an inlet through which liquid may flow into the vessel for separation therein into upper and lower immiscible portions and separate outlets one for each of said immiscible liquids through which each of said portions may flow from the vessel, the outlet for said upper portion being spaced above the outlet for said lower portion, liquid flow control means including means positioned for actuation by the liquid in the vessel to close the inlet when the liquid rises to a predetermined upper level and to open the inlet when the liquid falls to a predetermined lower level, means for selectively opening and closing said outlets means for preventing the opening of said inlet during the outflow of liquid from the vessel and means for recording each opening of each of said outlets.

3. Apparatus for the separating, metering and separate dispensing of immiscible liquids comprising a vessel having an inlet through which liquid may flow into the vessel for separation therein to upper and lower immiscible portions and separate outlets one for each of said immiscible portions through which each of said portions may flow from the vessel, the outlet for said upper portion being spaced above the outlet for said lower portion, liquid flow control means including means positioned for actuation by the liquid in the vessel to close the inlet when the liquid rises to a predetermined upper level and to open the inlet when the liquid falls to a preedtermined lower level, means for selectively opening and closing said outlets, means for preventing opening of either of said outlets while the other of said outlets is open and means for recording each opening of each of said outlets.

4. Apparatus for the separating, metering and separate dispensing of immiscible liquids comprising a vessel having an inlet through which liquid may flow into the vessel for separation therein into upper and lower immiscible portions an upper outlet through which the liquid of said upper portion may flow from the vessel and a lower outlet through which the liquid of said lower portion may flow therefrom, means for closing the inlet in response to a rise in the level of liquid in the vessel when the same reaches a predetermined level and for opening the inlet in response to a fall in such level when the same reaches a predetermined lower level, means for opening either of said outlets when the liquid rises to said upper level and for closing the same when the liquid falls to said lower level, means responsive to the level of said lower portion for selectively opening either said inlet or said outlet and means for recording each opening of each of said outlets.

5. Apparatus for the separating, metering and separate dispensing of immiscible liquids comprising a vessel having an inlet through which liquid may flow into the vessel for separation therein into upper and lower immiscible portions and separate outlets through which each of said portions may flow from the vessel, valve means for opening and closing said inlet, valve means for opening and closing each of said outlets, means responsive to a rise in the level of the liquid in the vessel for actuating said valve means to close said inlet valve and open a selected one of said outlet valves when the liquid reaches a predetermined upper level, means responsive to the lowering of the level of the liquid in the vessel for actuating said valve means to open said inlet valve and close said selected outlet valve when the liquid falls to a predetermined lower level, means responsive to the level of liquid of said lower portion for selectively opening either said inlet or said outlet and separate means for recording each opening of each of said outlets.

6. Apparatus for the separating, metering and separate dispensing of immiscible liquids comprising a vessel having an inlet through which liquid may flow into the vessel for separation therein into upper and lower immiscible portions and separate outlets through which each of said portions may flow from the vessel, valve means for opening and closing said inlet, valve means for opening and closing each of said outlets, motor means for each of said valve means, means responsive to an increase in the volume of liquid in the vessel for actuating said motor means to close the inlet valve and open a selected one of said outlet valves when the level of liquid reaches a predetermined level, means responsive to an increase in the volume of said lower portion for preventing the opening of one of said outlet valves when the level of said lower portion is at or above a predetermined level and means for recording the number of times during which outflow takes place from each of said outlets.

7. Apparatus for the separating, metering and separate dispensing of immiscible liquid comprising a vessel having an inlet through which liquid may flow into the vessel for separation therein into upper and lower immiscible portions and separate outlets through which each of said portions may flow from the vessel, valve means for opening and closing said inlet, valve means for opening and closing each of said outlets, motor means for each of said valve means, means responsive to an increase in the volume of liquid in the vessel for actuating said motor means to close the inlet valve and open a selected one of said outlet valves when the level of liquid reaches a predetermined level, means responsive to the opening of one of said outlet valves for rendering the motor means of the other of said outlet valves inactive during the outflow of liquid from the vessel through said selected one of the outlet valves and means for recording the number of times during which outflow takes place from each of said outlets.

8. The apparatus of claim 6, wherein the motor means for said valve means are actuated by pressure fluid to open and close the valves.

9. The apparatus of claim 6 wherein the motor means for the valves are actuated by pressure fluid to open the valves when pressure fluid is supplied to the motor means and to close the valves upon discontinuance of such supply.

10. The apparatus of claim 6 wherein the motor means for the valves are actuated by pressure fluid to close the valves when pressure fluid is supplied to the motor means and to open the valves upon the discontinuance of such supply.

References Cited

UNITED STATES PATENTS

| | | | |
|---|---|---|---|
| 2,936,618 | 5/1960 | Milam | 73—200 |
| 3,135,113 | 6/1964 | Walker et al. | 73—200 |
| 3,145,565 | 8/1964 | Smith et al. | 73—200 |

JAMES J. GILL, *Primary Examiner.*

ROBERT S. SALZMAN, *Assistant Examiner.*